(12) United States Patent
Elshafie et al.

(10) Patent No.: US 12,413,961 B2
(45) Date of Patent: Sep. 9, 2025

(54) TECHNIQUES FOR PATH INFORMATION-BASED PHYSICAL LAYER SECURITY

(71) Applicant: QUALCOMM Incorporated, San Diego, CA (US)

(72) Inventors: Ahmed Elshafie, San Diego, CA (US); Hung Dinh Ly, San Diego, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 293 days.

(21) Appl. No.: 17/809,140

(22) Filed: Jun. 27, 2022

(65) Prior Publication Data

US 2023/0422027 A1 Dec. 28, 2023

(51) Int. Cl.
*H04W 12/02* (2009.01)
*H04L 9/40* (2022.01)
*H04W 12/069* (2021.01)

(52) U.S. Cl.
CPC .......... *H04W 12/02* (2013.01); *H04L 63/162* (2013.01); *H04W 12/069* (2021.01)

(58) Field of Classification Search
USPC ........................................................ 380/270
See application file for complete search history.

(56) References Cited

U.S. PATENT DOCUMENTS

| | | | |
|---|---|---|---|
| 10,014,920 B2 * | 7/2018 | Hammarwall | H04W 24/10 |
| 2019/0098497 A1 * | 3/2019 | Shapira | H04L 9/0875 |
| 2020/0044840 A1 * | 2/2020 | Chang | H04L 9/0822 |
| 2022/0141797 A1 * | 5/2022 | Shi | H04W 16/28 |
| | | | 455/456.2 |

OTHER PUBLICATIONS

Mathur S., et al., "Radio-Telepathy: Extracting a Secret Key from an Unauthenticated Wireless Channel", Proceedings of the 14th ACM International Conference on Mobile Computing and Networking, MOBICOM '08, ACM Press , New York, USA, Sep. 14, po. 128-139, XP058391680, Abstract, Figure 2, pages (Year: 2008).*

Mathur S., et al., "Radio-Telepathy: Extracted a Secret Key from an Unauthenticated Wireless Channel", Proceedings of the 14tr ACM International Conference on Mobile Computing and Networking, MOBICOM '08, ACM Press , New York, USA, Sep. 14, po. 128-139, XP058391680, Abstract, Figure 2, pages (Year: 2008).*

International Search Report and Written Opinion—PCT/US2023/067105—ISA/EPO—Sep. 4, 2023.

Mathur S., et al., "Radio-Telepathy: Extracting a Secret Key from an Unauthenticated Wireless Channel", Proceedings of the 14th ACM International Conference on Mobile Computing and Networking, MOBICOM '08, ACM Press , New York, USA, Sep. 14, 2008, pp. 128-139, XP058391680, Abstract, Figure 2, pp. 128-139.

Zeng K: "Physical Layer Key Generation in Wireless Networks: Challenges and Opportunities", IEEE Communications Magazine, IEEE Service Center, Piscataway, US, vol. 53, No. 6, Jun. 1, 2015, pp. 33-39, XP011583750, Abstract, pp. 33-39.

Zhang J., et al., "Key Generation From Wireless Channels: A Review", IEEE Access, vol. 4, Jan. 27, 2016, pp. 614-626, XP011602372, Abstract, pp. 614-623.

* cited by examiner

*Primary Examiner* — Sanchit K Sarker
(74) *Attorney, Agent, or Firm* — Arent Fox, LLP

(57) ABSTRACT

Aspects described herein relate to transmitting and/or receiving devices securing or authenticating communications at a physical layer based on generated or received path information.

17 Claims, 10 Drawing Sheets

TECHNIQUES FOR PATH INFORMATION-BASED PHYSICAL LAYER SECURITY

BACKGROUND

Aspects of the present disclosure relate generally to wireless communication systems, and more particularly, to securing physical layer communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for wireless communication is provided that includes a transceiver, a memory configured to store instructions, and one or more processors communicatively coupled with the memory and the transceiver. The one or more processors are configured to generate path information for each of multiple reference signals received over one of multiple different paths from a transmitting device, and at least one of: decode communications received from the transmitting device based on a secret key generated from at least a portion of the path information for at least a portion of the multiple reference signals; encode communications for transmitting to the transmitting device based on the secret key generated from at least the portion of the path information for at least the portion of the multiple reference signals; or authenticate communications received from the transmitting device based on comparing received path information of the communications with the path information for one of the multiple different paths indicated for the communications.

In another aspect, an apparatus for wireless communication is provided that includes a transceiver, a memory configured to store instructions; and one or more processors communicatively coupled with the memory and the transceiver. The one or more processors are configured to transmit, to a receiving device, multiple reference signals over multiple different paths, receive, from the receiving device, path information for each of the multiple reference signals, and at least one of: encode, based on a secret key generated from at least a portion of the path information for at least a portion of the multiple reference signals, communications for transmitting to the receiving device; decode, based on the secret key generated from at least the portion of the path information for at least the portion of the multiple reference signals, communications received from the receiving device; or transmit, to the receiving device, communications over one of the multiple different paths, wherein the communications include a parameter indicating the one of the multiple different paths over which the communications are transmitted.

In another aspect, a method for wireless communication is provided that includes generating, by a receiving device, path information for each of multiple reference signals received over one of multiple different paths from a transmitting device, and at least one of: decoding communications received from the transmitting device based on a secret key generated from at least a portion of the path information for at least a portion of the multiple reference signals; encoding communications for transmitting to the transmitting device based on the secret key generated from at least the portion of the path information for at least the portion of the multiple reference signals; or authenticating communications received from the transmitting device based on comparing received path information of the communications with the path information for one of the multiple different paths indicated for the communications.

In yet another aspect, a method for wireless communication is provided that includes transmitting, to a receiving device, multiple reference signals over multiple different paths, receiving, from the receiving device, path information for each of the multiple reference signals, and at least one of: encoding, based on a secret key generated from at least a portion of the path information for at least a portion of the multiple reference signals, communications for transmitting to the receiving device; decoding, based on the secret key generated from at least the portion of the path information for at least the portion of the multiple reference signals, communications received from the receiving device; or transmitting, to the receiving device, communications over one of the multiple different paths, wherein the communications include a parameter indicating the one of the multiple different paths over which the communications are transmitted.

In further aspects, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
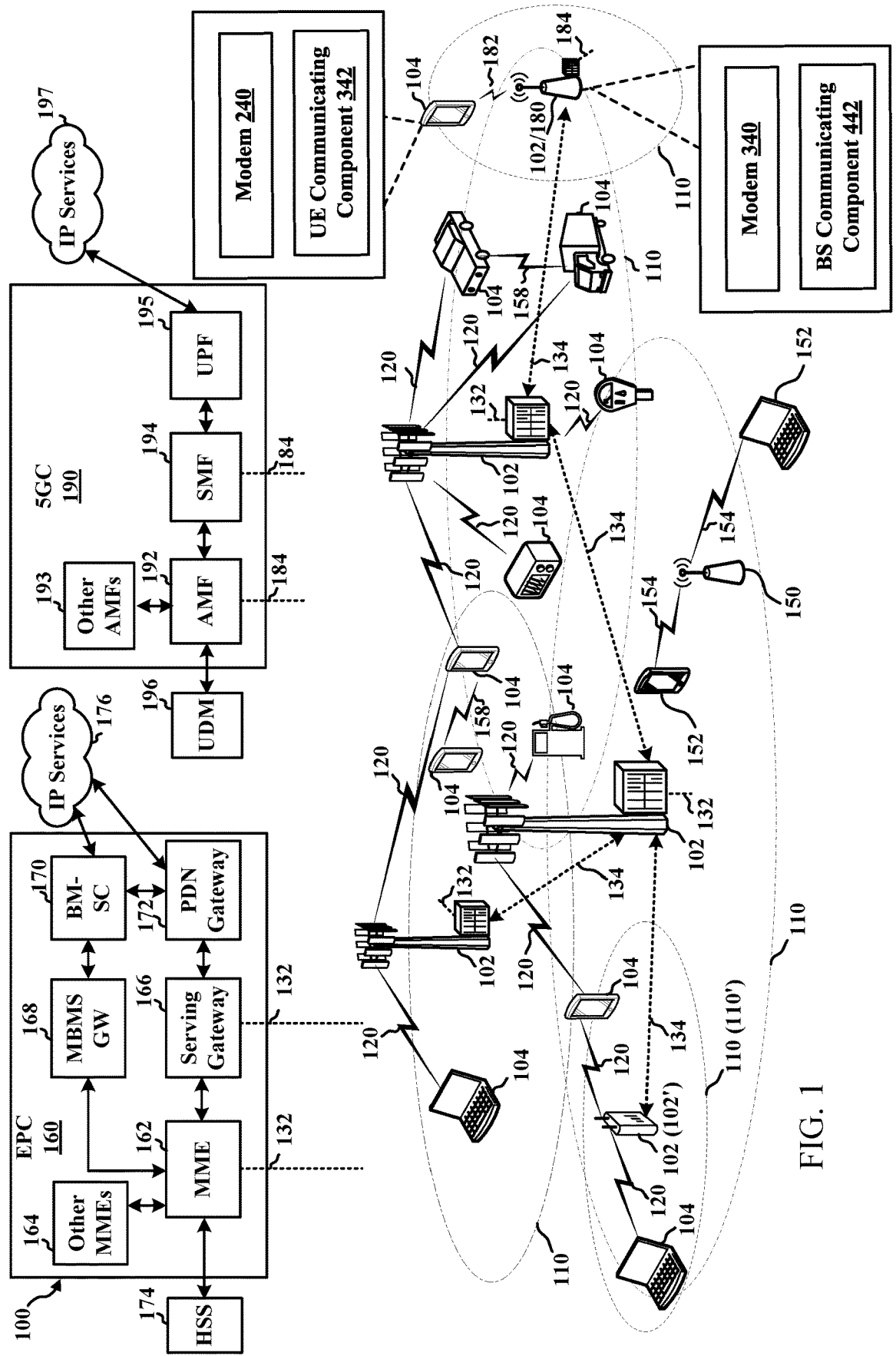
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to securing wireless communications at the physical (PHY) layer based on path information. In some wireless communication technologies, such as fifth generation (5G) new radio (NR), some channels may not be secured, and some receivers may not have mechanisms for upper layer security, such as reconfigurable intelligent surfaces (RISs) controller, passive Internet-of-things (IoT) controller, etc. Secure communications can be important in wireless communication systems, however. Aspects described herein provide for securing communications at the PHY layer, which may include generating secret keys for encoding and decoding communications, or authenticating communications as coming from an intended source, based on the path information. Accordingly, the communications can be secured regardless of whether a RIS, passive IoT device (e.g., radio frequency identification (RFID) tag), etc. is involved in facilitate the communications between a transmitting and receiving device.

For example, the path information may include a distance estimation based on signaling communicated between a transmitting and receiving device, a time-of-arrival (ToA) estimation based on signaling communicated between the transmitting and receiving device, a pathloss estimation based on signaling communicated between the transmitting and receiving device, an angle-of-arrival (AoA) estimation based on signaling communicated between the transmitting and receiving device, etc. In an example, one or more of these values can be estimated for multiple reference signals. The values for a pattern of reference signals can be used to generate a secret key for encoding and/or decoding wireless communications between the transmitting and receiving device. In another example, a transmitting device can send a communication to the receiving device, and the communication can indicate path information for the path over which the communication is sent. The receiving device, in this example, can authenticate the communication based on comparing the indicated path information to the path information of the path over which the communication is received.

Using physical layer path information, which is already being estimated and/or communicated between the devices, can provide a low overhead mechanism for securing and/or authenticating wireless communications between a transmitting and receiving device. Securing and authenticating communications can protect data being communicated between the devices from being intercepted, can protect the devices from unwanted or malicious communications between received or processed by upper layers, etc. This can improve the quality of communications between the devices, which can accordingly improve user experience when using the UE.

The described features will be presented in more detail below with reference to FIGS. 1-9.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include network entities 102, also referred to herein as base stations 102, including one or more components of a disaggregated base station, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and UE communicating component 342 for securing physical layer communications based on path information, in accordance with aspects described herein. In addition, some nodes may have a modem 340 and BS communicating component 442 for securing physical layer communications, in accordance with aspects described herein. Though a UE 104 is shown as having the modem 240 and UE communicating component 342 and a base station 102/gNB 180 is shown as having the modem 340 and BS communicating component 442, this is one illustrative example, and substantially any node or type of node may include a modem 240 and UE communicating component 342 and/or a modem 340 and BS communicating component 442 for providing corresponding functionalities described herein. Indeed, in one example, another UE may include the BS communicating component 442 for securing sidelink communications with the UE 104.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The network entity or base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, in a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.), including base station 102 described above and further herein, may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as virtually distributing functionality for at least one unit, which can enable flexibility in network design. The various units of the disaggregated base station, or disaggregated RAN architecture, can be configured for wired or wireless communication with at least one other unit.

In an example, UE communicating component 342 can receive signals from the base station 102 (or another UE) over multiple paths, and can estimate path information for each of the signals (e.g., distance, pathloss, received power, reference signal received power (RSRP), reference signal received quality (RSRQ), amplitude or phase of strongest time-domain channel tap, amplitude or phase of average time-domain channel tap, number of channel taps greater than a threshold (which can be a layer 1 (L1)/layer 2(L2)/layer 3 (L3) configurable threshold), signal-to-noise-plus-interference ratio (SINR) of specific taps or averaged across all taps or a subset of taps (which may be selected by an L1/L2/L3 configurable threshold), ToA, AoA, etc.). UE communicating component 342 can communicate the path information to the base station 102 (or another UE), and can use the path information to generate a secret key for encoding or decoding communications with the base station 102 (or another UE), to authenticate communications from the base station 102 (or another UE), etc., as described further herein. In an example, the base station 102 (or another UE) can include a BS communicating component 442 that can receive the path information from UE communicating component 342 of UE 104, and can use this information for similarly encoding or decoding communications with the UE 104, authenticating communications transmitted to the UE 104, etc.

Figure 2:
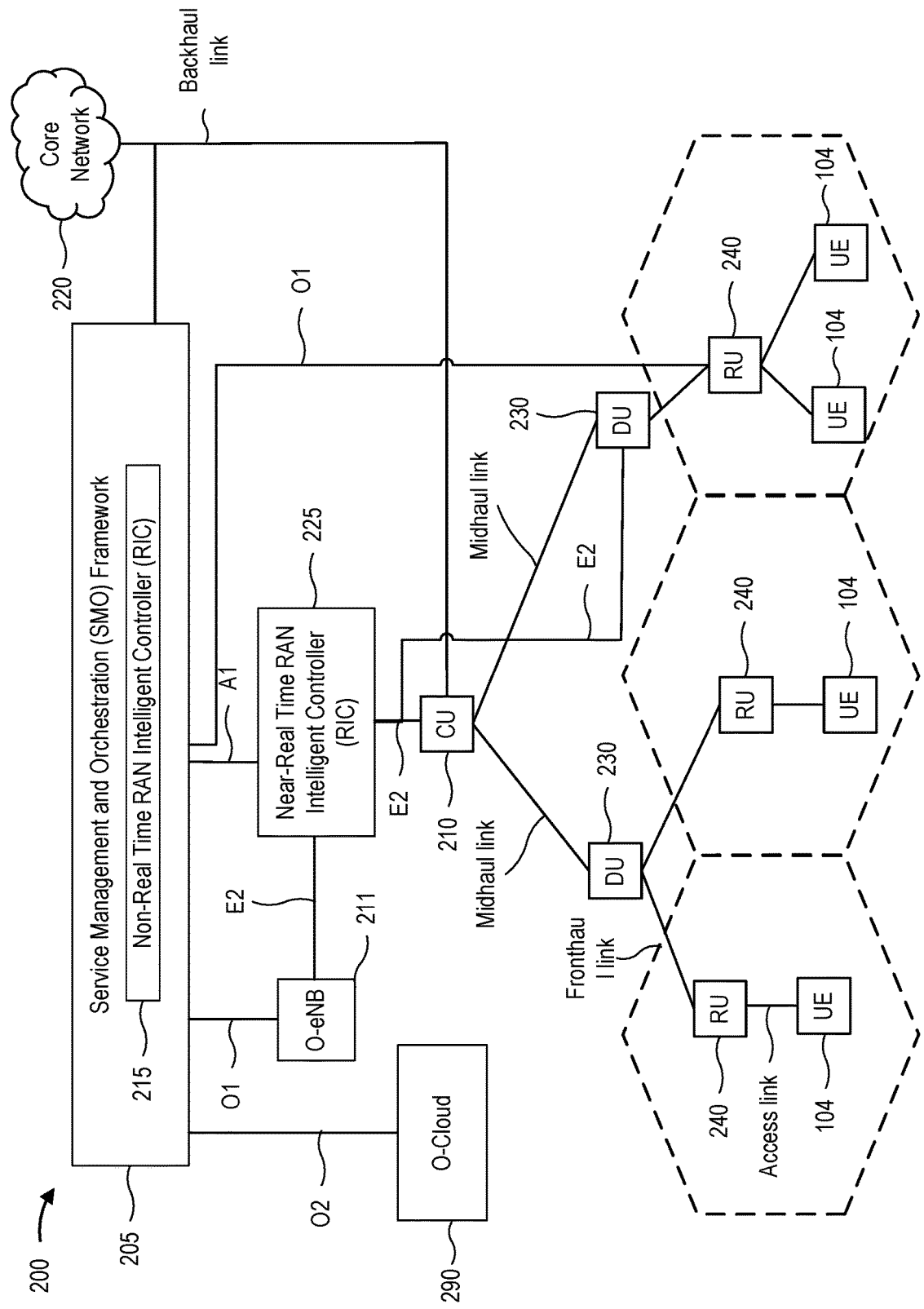
FIG. 2 is a diagram illustrating an example of disaggregated base station architecture, in accordance with various aspects of the present disclosure.

FIG. 2 shows a diagram illustrating an example of disaggregated base station 200 architecture, wherein, as noted above, one or more components of which may be included when the terms network entity or a base station are used herein. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the third Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Turning now to FIGS. 3-10, aspects are depicted with reference to one or more components and one or more methods that may perform the actions or operations described herein, where aspects in dashed line may be optional. Although the operations described below in FIGS. 5, 6, 8, and 9 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Figure 3:
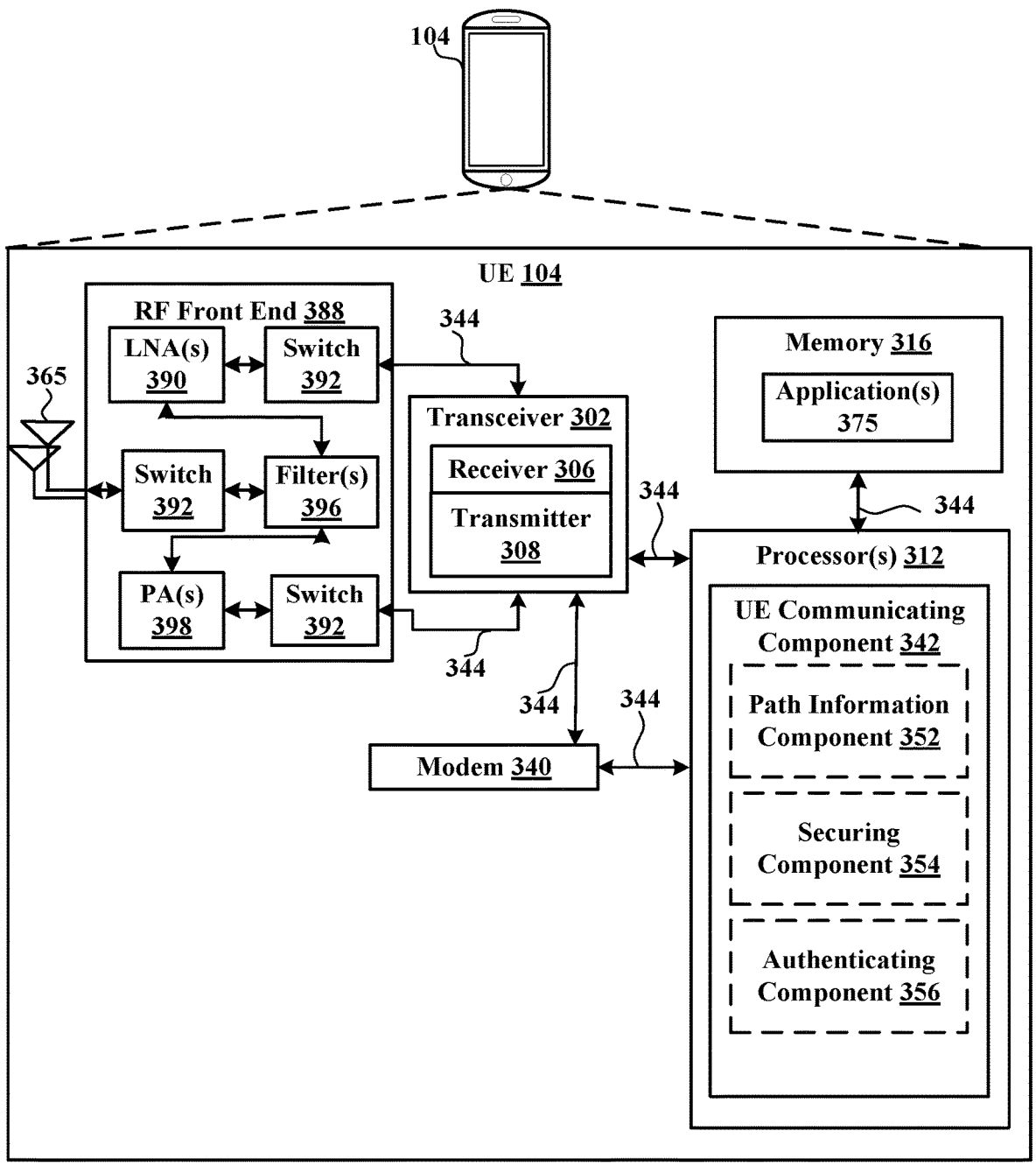
FIG. 3 is a block diagram illustrating an example of a user equipment (UE), in accordance with various aspects of the present disclosure.

Referring to FIG. 3, one example of an implementation of UE 104 may include a variety of components, some of which have already been described above and are described further herein, including components such as one or more processors 312 and memory 316 and transceiver 302 in communication via one or more buses 344, which may operate in conjunction with modem 340 and/or UE communicating component 342 for securing communications at a PHY layer based on path information, in accordance with aspects described herein.

In an aspect, the one or more processors 312 can include a modem 340 and/or can be part of the modem 340 that uses one or more modem processors. Thus, the various functions related to UE communicating component 342 may be included in modem 340 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 340 associated with UE communicating component 342 may be performed by transceiver 302.

Also, memory 316 may be configured to store data used herein and/or local versions of applications 375 or UE communicating component 342 and/or one or more of its subcomponents being executed by at least one processor 312. Memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining UE communicating component 342 and/or one or more of its subcomponents, and/or data associated therewith, when UE 104 is operating at least one processor 312 to execute UE communicating component 342 and/or one or more of its subcomponents.

Transceiver 302 may include at least one receiver 306 and at least one transmitter 308. Receiver 306 may include hardware, firmware, and/or software code executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by at least one base station 102 or another UE 104. Additionally, receiver 306 may process such received signals, and also may obtain measurements of the signals, such as, but not limited to, Ec/Io, signal-to-noise ratio (SNR), reference signal received power (RSRP), received signal strength indicator (RSSI), etc. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, UE 104 may include RF front end 388, which may operate in communication with one or more antennas 365 and transceiver 302 for receiving and transmitting radio transmissions, for example, wireless communications transmitted by at least one base station 102 or another UE 104, or wireless transmissions transmitted by UE 104. RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 390 and its specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that UE 104 can communicate with, for example, one or more base stations 102 or one or more cells associated with one or more base stations 102, or with one or more other UEs 104. In an aspect, for example, modem 340 can configure transceiver 302 to operate at a specified frequency and power level based on the UE configuration of the UE 104 and the communication protocol used by modem 340.

In an aspect, modem 340 can be a multiband-multimode modem, which can process digital data and communicate with transceiver 302 such that the digital data is sent and received using transceiver 302. In an aspect, modem 340 can be multiband and be configured to support multiple frequency bands for a specific communications protocol. In an aspect, modem 340 can be multimode and be configured to support multiple operating networks and communications protocols. In an aspect, modem 340 can control one or more components of UE 104 (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, UE communicating component 342 can optionally include a path information component 352 for estimating path information between the UE 104 and the base station 102 (or another UE), a securing component 354 for securing (e.g., encoding or decoding) communications at the PHY layer based on the path information, and/or an authenticating component 356 for authenticating communications received from the base station 102 (or another UE) based on the path information, in accordance with aspects described herein.

In an aspect, the processor(s) 312 may correspond to one or more of the processors described in connection with the UE in FIG. 10. Similarly, the memory 316 may correspond to the memory described in connection with the UE in FIG. 10.

Figure 4:
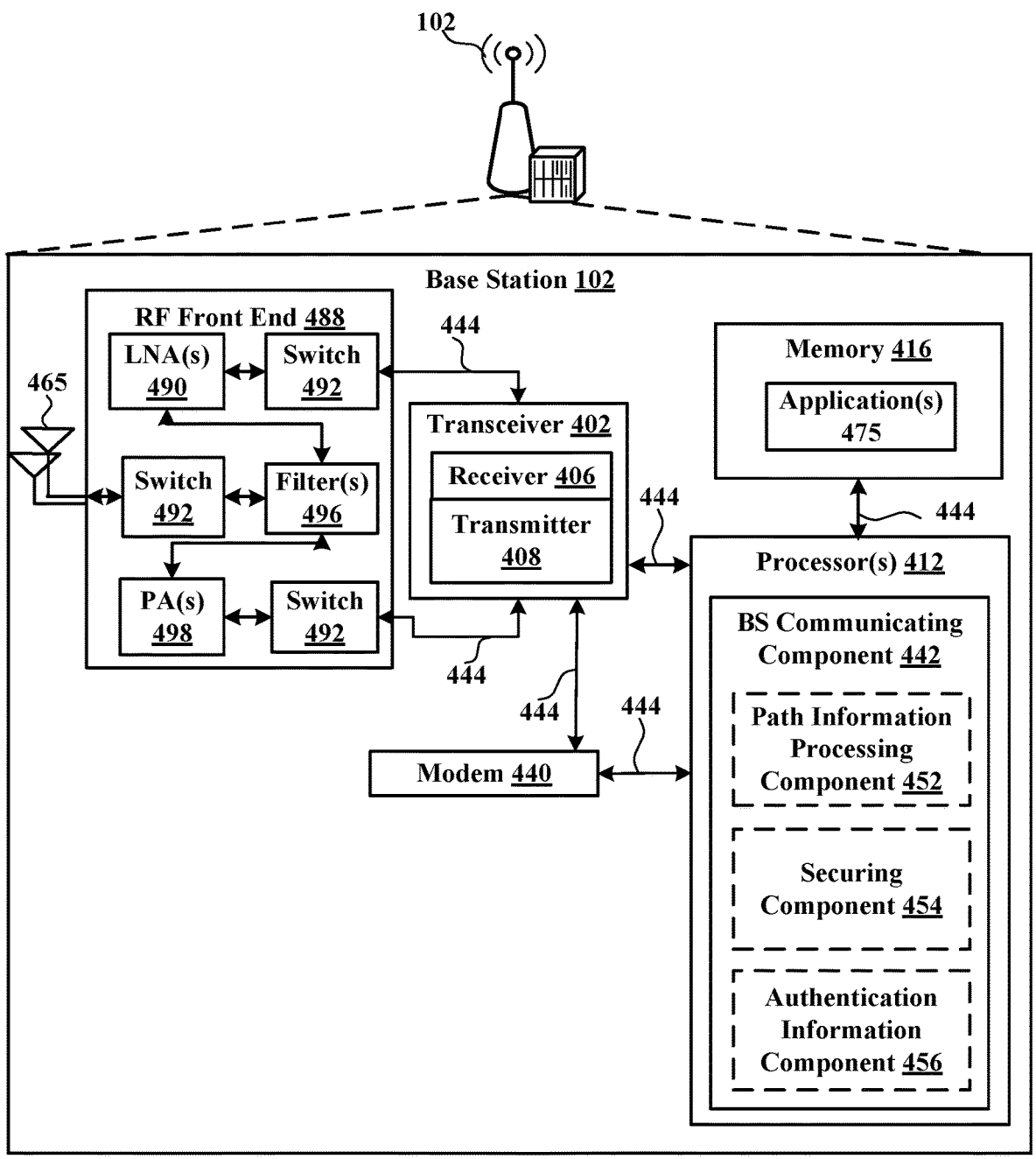
FIG. 4 is a block diagram illustrating an example of a base station, in accordance with various aspects of the present disclosure.

Referring to FIG. 4, one example of an implementation of base station 102 (e.g., a base station 102 and/or gNB 180, a monolithic base station, one or more components of a disaggregated base station, etc., as described above) may include a variety of components, some of which have already been described above, but including components such as one or more processors 412 and memory 416 and transceiver 402 in communication via one or more buses 444, which may operate in conjunction with modem 440 and BS communicating component 442 for securing communications at a PHY layer based on path information, in accordance with aspects described herein. In another example, as described herein, BS communicating component 442 can be implemented in a UE for sidelink communications with another UE 104. In one example, a UE can have both the UE communicating component 342 and the BS communicating component 442 for securing and/or authenticating communications with another UE 104.

The transceiver 402, receiver 406, transmitter 408, one or more processors 412, memory 416, applications 475, buses 444, RF front end 488, LNAs 490, switches 492, filters 496, PAs 498, and one or more antennas 465 may be the same as or similar to the corresponding components of UE 104, as described above, but configured or otherwise programmed for base station operations as opposed to UE operations.

In an aspect, BS communicating component 442 can optionally include a path information processing component 452 for receiving and/or processing path information received from a UE, a securing component 454 for securing (e.g., encoding or decoding) communications at the PHY layer based on the path information, and/or an authentication information component 456 for including authentication information in communications transmitted to the UE, in accordance with aspects described herein.

In an aspect, the processor(s) 412 may correspond to one or more of the processors described in connection with the base station in FIG. 10. Similarly, the memory 416 may correspond to the memory described in connection with the base station in FIG. 10.

Figure 5:
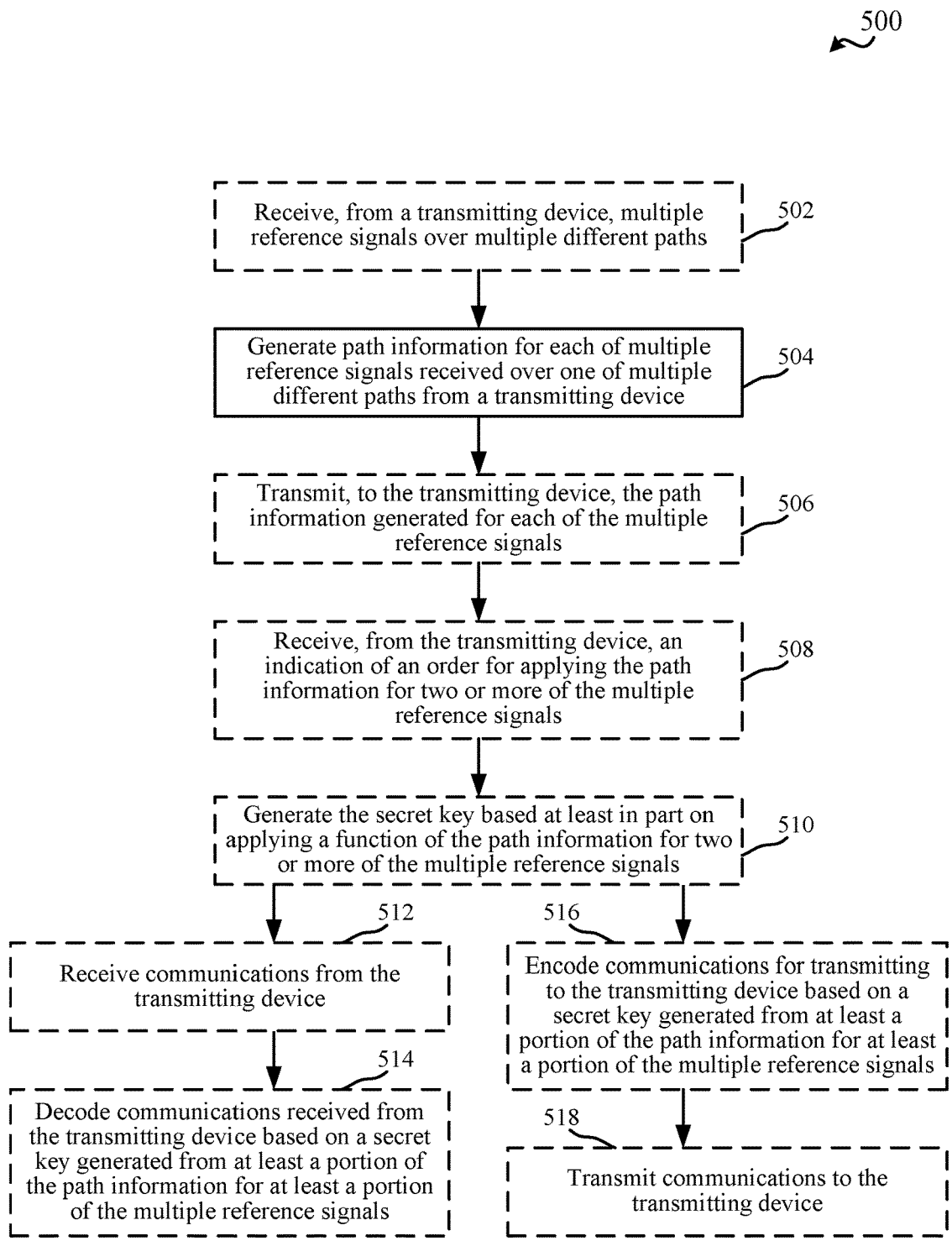
FIG. 5 illustrates a flow chart of an example of a method for securing physical layer communications using a secret key based on estimated path information, in accordance with aspects described herein.
Figure 6:
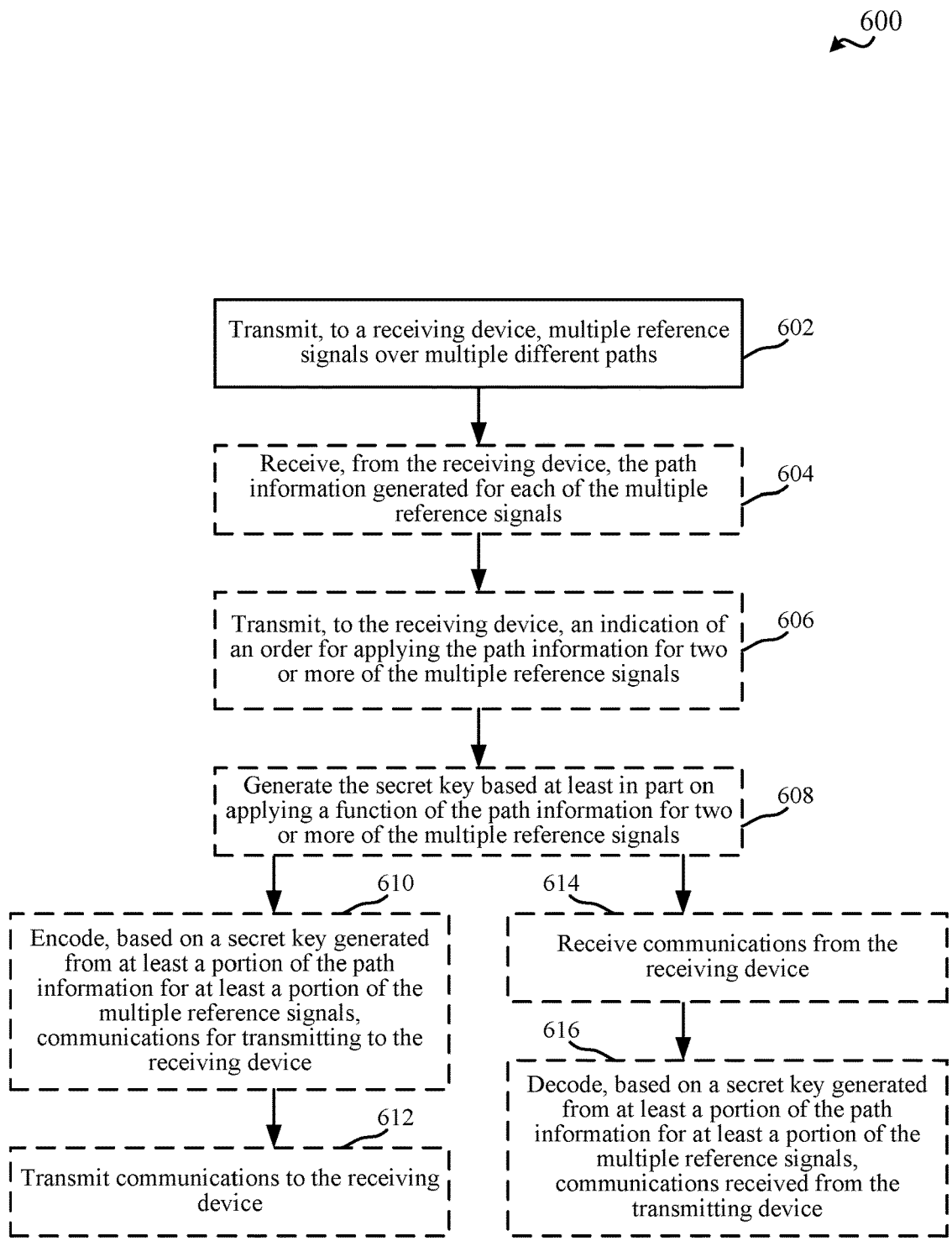
FIG. 6 illustrates a flow chart of an example of a method for securing physical layer communications using a secret key based on received path information, in accordance with aspects described herein.

FIG. 5 illustrates a flow chart of an example of a method 500 for securing physical layer communications using a secret key based on estimated path information, in accordance with aspects described herein. FIG. 6 illustrates a flow chart of an example of a method 600 for securing physical layer communications using a secret key based on received path information, in accordance with aspects described herein. In an example, a UE 104 can perform the functions described in method 500 using one or more of the components described in FIGS. 1 and 3, and a base station 102 or another UE (e.g., in sidelink communications with UE 104) can perform the functions described in method 600 using one or more of the components described in FIGS. 1 and 4. Methods 500 and 600 are described in conjunction with one another for ease of explanation. These methods, however, are not required to be performed in conjunction with one another, and different devices can be configured to perform the methods without requiring the other device.

In method 600, at Block 602, multiple reference signals can be transmitted, to a receiving device, over multiple different paths. In an aspect, BS communicating component 442, e.g., in conjunction with processor(s) 412, memory 416, transceiver 402, etc., can transmit, to the receiving device, multiple reference signals over multiple different paths. For example, the base station 102 (or other UE in sidelink communications) can transmit to the UE 104 using multiple different paths, which may include a direct path to the UE 104, a path through one or more forwarding components, such as a RIS, passive IoT device such as a RFID tag, a relay device (e.g., an amplify-and-forward (AF) half-duplex (HD) or full-duplex (FD) relay device), etc. An example is shown in FIG. 7.

Figure 7:
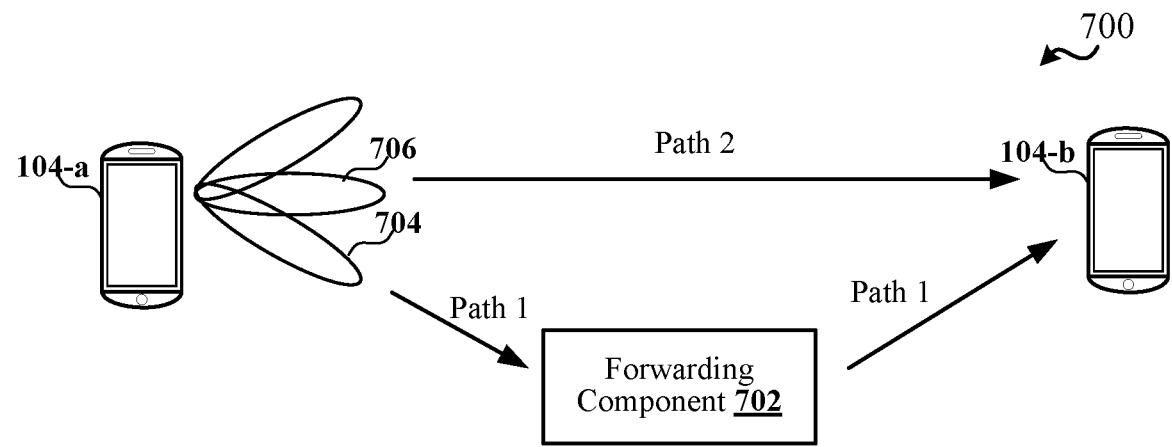
FIG. 7 illustrates an example of a wireless communication system, in accordance with aspects described herein.

FIG. 7 illustrates an example of a wireless communication system 700 including a UE 104-*a* and another UE 104-*b*, though one or more of the UEs may be a base station 102 or other device, as described herein. Wireless communication includes a forwarding component 702 that can forward signal received from one UE 104-*a* to another UE 104-*b* (or other device). For example, forwarding component 702 may include one or more of a RIS, passive IoT device, such as a RFID tag, a relay device (e.g., an AF FD relay device), etc. In this regard, for example, UE 104-*a* can transmit reference signals and/or other signals to UE 104-*b* using Path 1, which may be based on a first beam 704 and which traverses the forwarding component 702. In this example, UE 104-*a* can also transmit reference signals and/or other signals to UE 104-*b* using Path 2, which may be based on a second beam 706 and may not traverse a forwarding component, or may otherwise be directly between the UEs 104-*a* and 104-*b*. In general, for example, UE 104-*b* can use the information of the strongest path detected by the UE 104-*b* to determine the path information (e.g., distance, pathloss, received power, RSRP, RSRQ, amplitude or phase of strongest time-domain channel tap, amplitude or phase of average time-domain channel tap, number of channel taps greater than an L1/L2/L3 configurable threshold, signal-to-noise-plus-interference ratio of specific taps or averaged across all taps or a subset of taps selected by an L1/L2/L3 configurable threshold, ToA, AoA) used for communication between the UEs 104-*a* and 104-*b*.

In method 500, optionally at Block 502, multiple reference signals can be received, from a transmitting device, over multiple different paths. In an aspect, UE communicating component 342, e.g., in conjunction with processor(s) 312, memory 316, transceiver 302, etc., can receive, from the transmitting device (e.g., a base station 102 or another UE), the multiple reference signals over the multiple different paths. For example, as shown in FIG. 7, UE communicating component 342 can receive the multiple reference signals over a direct path, a path that can traverse a forwarding component, etc. The paths can have distinct path characteristics (and thus estimated path information). For example, the potential path information could be {P1, P2, . . . , PN} for N Paths/Routes, where each path is associated with some information such as distances, {d1, d2, . . . , dN}, and AoAs, {Phi1, Phi2, . . . , PhiN}. In an example, Path/Route Information can be used to determine a secret key (SK) that the transmitting device wants the receiving device to use while communicating with it. Thus, in an example, BS communicating component 442 can send, and/or UE communicating component 342 can receive, a set of time division multiplexed (TDMed) reference signals (or TDMed/frequency division multiplexed (FDMed) where each subband is beamformed to a certain direction and reflected by a certain forwarding component). Based on a desired SK, the transmitting device can send various RSs to result on the desired path information being used to generate the SK, as described further herein.

In method 500, at Block 504, path information for each of multiple reference signals received over one of multiple different paths from a transmitting device can be generated. In an aspect, path information component 352, e.g., in conjunction with processor(s) 312, memory 316, transceiver 302, UE communicating component 342, etc., can generate the path information for each of multiple reference signals received over one of multiple different paths from the transmitting device. For example, path information component 352 can generate or estimate a distance metric between the UE 104 and transmitting device, or the UE 104 and forwarding component, based on a signal strength or quality measurement of each of the multiple reference signals. In another example, path information component 352 can generate or estimate a time-of-arrival of each of the multiple reference signals. In another example, path information component 352 can generate or estimate a pathloss of each of the multiple reference signals (e.g., based at least in part on a difference between a signal transmission time indicated in the signals and a time at which the signals were received). In another example, path information component 352 can generate or estimate an angle-of-arrival of each of the multiple reference signals at an antenna or RF element of the UE 104.

In method 500, optionally Block 506, the path information generated for each of the multiple reference signals can be transmitted to the transmitting device. In an aspect, path information component 352, e.g., in conjunction with processor(s) 312, memory 316, transceiver 302, UE communicating component 342, etc., can transmit, to the transmitting device, the path information generated for each of the multiple reference signals. For example, path information component 352 can transmit the path information as part of feedback for the reference signals, based on which the transmitting device can determine one or more parameters for PHY layer communication with the UE 104, such as a modulation and coding scheme (MCS), rank indicator (RI), precoding matrix indicator (PMI), etc. For example, the UE 104 as the receiving device can determine a set of (distinguishable) paths, can associate each path with an identifier (e.g., a reference signal identifier indicated by the reference signal can be used), and can send the path information (e.g., distance, pathloss, received power, RSRP, RSRQ, amplitude or phase of strongest time-domain channel tap, amplitude or phase of average time-domain channel tap, number of channel taps greater than an L1/L2/L3 configurable threshold, signal-to-noise-plus-interference ratio of specific taps or averaged across all taps or a subset of taps selected by an L1/L2/L3 configurable threshold, ToA, AoA), or just the identifiers of the best paths, to the transmitting device.

In method 600, optionally Block 604, the path information generated for each of the multiple reference signals can be received from the receiving device. In an aspect, path information processing component 452, e.g., in conjunction with processor(s) 412, memory 416, transceiver 402, BS communicating component 442, etc., can receive, from the receiving device, the path information generated for each of the multiple reference signals. For example, path information processing component 452 can receive the path information as part of feedback for the reference signals, based on which the UE 104 as the transmitting device can determine one or more parameters for PHY layer communication with the receiving device, such as a MCS, RI, PMI, etc. In one example, as described the path information may just include the identifiers of the best paths.

In this example, the transmitting device and the receiving device can have the same set of path information for each of the reference signals, which may include the identifier of the reference signal of the best paths, the distance metric, ToA, pathloss, AoA, etc. In any case, the transmitting device and receiving device may use this information to (e.g., independently) generate a secret key for communications. In one example, the transmitting device can indicate a pattern for applying the path information to generate the secret key, which may include indicating an ordering of the path information for the reference signals to use in generating the secret key. For example, transmitting device may indicate the ordering by transmitting the reference signals in a certain order, and the receiving device (and transmitting device) can apply the path information for the reference signals according to an order by which the reference signals are transmitted/received.

For example, in method 600, optionally Block 606, an indication of an order for applying the path information for two or more of the multiple reference signals can be transmitted to the receiving device. In an aspect, BS communicating component 442, e.g., in conjunction with processor(s) 412, memory 416, transceiver 402, etc., can transmit, to the receiving device, the indication of the order for applying the path information for the two or more of the multiple reference signals. For example, BS communicating component 442 can transmit the indication in explicit signaling or implicitly by transmitting the reference signals to the receiving device in a certain order.

For example, in method 500, optionally Block 508, an indication of an order for applying the path information for two or more of the multiple reference signals can be received from the transmitting device. In an aspect, UE communicating component 342, e.g., in conjunction with processor(s) 312, memory 316, transceiver 302, etc., can receive, from the transmitting device, the indication of the order for applying the path information for the two or more of the multiple reference signals. For example, UE communicating component 342 can receive the indication in explicit signaling or implicitly by receiving the reference signals from the transmitting device in a certain order, where the order can represent the order of combining or applying path information to generate the secret key.

In this regard, for example, the transmitting device can send another indication (before or after sending the reference signal) to use a certain/subset of path information of a subset of reference signals to generate the secret key. This can help in ordering how to use the path information observed by each reference signal. In one example, the transmitting device can send a subset of reference signals in a certain pattern to be used in generating the secret key.

In method 500, optionally Block 510, the secret key can be generated based at least in part on applying a function of the path information for two or more of the multiple reference signals. In an aspect, securing component 354, e.g., in conjunction with processor(s) 312, memory 316, transceiver 302, UE communicating component 342, etc., can generate the secret key based at least in part on applying the function of the path information for two or more of the multiple reference signals. In an example, securing component 354 can apply the function of path information using an order of path information indicated by the transmitting device, as described above. In addition, for example, securing component 354 can apply the function of path information using certain values that may be configured between the devices or otherwise known. As described, for example, securing component 354 can use at least one of values of the exact path information transmitted to the transmitting device, labels or identifiers (e.g., the reference signal identifiers), or a combination thereof to generate the secret key. In one example, the function can be a hash function using the path information values, such as a hash message authentication code (HMAC) function, which may use a secure hash algorithm (SHA), such as SHA256 based on 256 bits. In an example, such a function may have a signature similar to the following:

HMAC-SHA256(key, timestamp, parameters).

In an example, the transmitting device can try to instruct the receiving device to use a certain secret key by sending a set of reference signals, where each reference signal is sent using certain beams across all forwarding components, the transmitting device, and the receiving device (e.g., the receiving device can fix a beam). The receiving device can detect distances for the reference signal. In an specific example, the distances can be d1, d4, dN, d2. The secret key can depend on distances/AoAs values measured on the reference signals, such that values can result in different secret keys. For example, d1=can give a secret key that is different from d1=5. Order of distances/AoAs—order of estimated paths information—can be based on time to receive each reference signal (or based on agreement between the devices to process each RS). For example, the set of path information {P1, P2} can give a secret key that is different from {P2, P1}. Combination of paths {P1, P2} can give a secret key that is different from {P1, P3}.

In method 600, optionally Block 608, the secret key can be generated based at least in part on applying a function of the path information for two or more of the multiple reference signals. In an aspect, securing component 454, e.g., in conjunction with processor(s) 412, memory 416, transceiver 402, BS communicating component 442, etc., can generate the secret key based at least in part on applying the function of the path information for two or more of the multiple reference signals. In an example, securing component 454 can apply the function of path information using an order of path information indicated by the UE 104, as the transmitting device, in signaling reference signals or other information to the receiving device, as described above. In addition, for example, securing component 454 can apply the function of path information using certain values that may be configured between the devices or otherwise known. As described, for example, securing component 454 can use at least one of values of the exact path information transmitted to the transmitting device, labels or identifiers (e.g., the reference signal identifiers), or a combination thereof to generate the secret key. In any case, for example, the transmitting device and receiving device can use the same values and the same function to generate the secret key, which can result in the devices generate the same secret key. This secret key can then be used to secure communications between the devices.

For example, in method 600, optionally at Block 610, communications for transmitting to the receiving device can be encoded, based on a secret key generated from at least a portion of the path information for at least a portion of the multiple reference signals. In an aspect, securing component 454, e.g., in conjunction with processor(s) 412, memory 416, transceiver 402, BS communicating component 442, etc., can encode, based on the secret key generated from at least the portion of the path information for at least the portion of the multiple reference signals, communications for transmitting to the receiving device. For example, securing component 454 can sign the communications at the PHY layer using the secret key to maintain authentication or integrity. In one example, securing component 454 can sign a hashed value representing the path or path information, or can sign just the value of the path or path information without hashing, or can sign one or more of quantities of the path (e.g., distance, pathloss, AoA, ToA, etc.) or can jointly sign (without or with hashing) the value of the path along with some path information (e.g., distance pathloss, AoA, ToA, etc.).

In one specific example, securing component 454 can encode the communications using a commitment scheme (e.g., cryptographic commitment), which may leverage a Pederson commitment (e.g., based on hardness of discrete log problems and/or unconditionally hiding and computationally binding). In this example, as a precondition, public parameters (p,g,h) can be shared with the UEs (e.g., via L1/L2/L3 signaling, where L3 may provide some level of security). In this example, p can be a large prime, g can be a number in [2, p−1], and h can be an element in [2, p−1] such that log g h is unknown. In this example, securing component 454 can provide $g^{ID}h^r$ mod p as a commitment of path information, where ID is path information with a timestamp and/or scrambling IDs from the network node (or from a controlling UE in sidelink communications). Sequence and r can be random numbers. The commitment of path information can be provided to the UE using L1/L2/L3 signaling. In this example, securing component 454 can broadcast r. In addition, securing component 454 can transmit r together with the corresponding channel bits transmission (e.g., for data or control channel with channel coding as probabilistic amplitude shaping (PAS)). The UE can verify the committed value after receiving the channel and r.

In another specific example, securing component 454 can encode the communications using a Pederson commitment with Fiat-Shamir scheme, which may leverage zero-knowledge proof (ZKP) based on hardness of discrete log problems and/or unconditionally hiding and computationally binding, where the secret may not be shared with UEs. In this example, securing component 454 can have a private key x and public value $y=g^x$ mod p, where g can be the generator of the multiplicative group of integers modulo p. The securing component 454 can select a random v and can compute $t=g^v$. The securing component 454 can also compute c=H(g,y,t, ID), where H( ) is a cryptographic hash function, and r=v−cx. The proof is the pair (t,r); ($g^v$, v−cx). In this example, the UE 104 in decoding the communication can calculate c=H(g,y,t, ID) and check whether $t=g^r g^{xc}=g^v$. If so, the UE can verify the communication. This can provide a flexible and secure operation where each network node can calculate c while a dedicated function that holds a secret x can compute (t,r). This may be an efficient signature scheme in terms of signature size being considered (e.g., Boneh Lynn Shacham (BLS) signature based on Bilinear pairing on EC may require 256 bits).

In yet another specific example, securing component 454 can encode the communications with a digital signature using Rivest Shamir Adleman (RSA). In this example, message m can be encrypted, and can include pathloss information, for example. Securing component 454, for example, can compute $H_m$=Hash(m) to add further security and compressed size. Securing component 454 can sign $H_m$, e.g., $\text{sign}_m = (H_m)^d$ mod n, and can transmit m and $\text{sign}_m$, along with encrypted data signal which is sent into direction of same path. In this example, the UE 104 can decode/determine m, Hash m to get $H_m$=Hash(m), determine $\text{sign}_m$, and apply public key e, i.e., $(\text{sign}_m)^e = (H_m)^{de}$ mod n=$H_m$. If $H_m = (H_m)^{de}$ mod n, then the message m is authenticated, it is coming from the network node owning the private key d.

For example, in method 600, optionally at Block 612, communications can be transmitted to the receiving device. In an aspect, BS communicating component 442, e.g., in conjunction with processor(s) 412, memory 416, transceiver 402, etc., can transmit the communications, as secured, to the receiving device.

For example, in method 500, optionally at Block 512, communications can be received from the transmitting device. In an aspect, UE communicating component 342, e.g., in conjunction with processor(s) 312, memory 316, transceiver 302, etc., can receive the communications, as secured, from the transmitting device. For example, in method 500, optionally at Block 514, communications received from the transmitting device can be decoded, based on a secret key generated from at least a portion of the path information for at least a portion of the multiple reference signals. In an aspect, securing component 354, e.g., in conjunction with processor(s) 312, memory 316, transceiver 302, UE communicating component 342, etc., can decode, based on the secret key generated from at least the portion of the path information for at least the portion of the multiple reference signals, communications received from the transmitting device. For example, securing component 354 can decode the communications received through the path at least in part by determining the path information used to transmit the communications (e.g., by using an example DMRS associated with communications). In an example, securing component 354 can determine the path based on determining distance, pathloss, AoA, ToA, etc., and/or performing some comparison with acceptable error (e.g., securing component 354 may be configured with some agreed criterion such as minimum square error between measured value of a quantity and the stored value. As the UE 104 can have stored values for path information of different paths, as described above, securing component 354 can compare the determined path with the signed communications (which indicates the path) to verify the communications. In an example, securing component 354 can decode the communications using one or more of the processes outlined above for cryptographic commitment, Pederson commitment with Fiat-Shamir scheme, or digital signature using RSA. This can maintain authentication or integrity for the communications.

In another example, in method 500, optionally at Block 516, communications for transmitting to the transmitting device can be encoded, based on a secret key generated from at least a portion of the path information for at least a portion of the multiple reference signals. In an aspect, securing component 354, e.g., in conjunction with processor(s) 312, memory 316, transceiver 302, UE communicating component 342, etc., can encode, based on the secret key generated from at least the portion of the path information for at least the portion of the multiple reference signals, communications for transmitting to the transmitting device. For example, securing component 354 can sign the communications at the PHY layer using the secret key. For example, in method 500, optionally at Block 518, communications can be transmitted to the transmitting device. In an aspect, UE communicating component 342, e.g., in conjunction with processor(s) 312, memory 316, transceiver 302, etc., can transmit the communications, as secured, to the transmitting device.

For example, in method 600, optionally at Block 614, communications can be received from the receiving device. In an aspect, BS communicating component 442, e.g., in conjunction with processor(s) 412, memory 416, transceiver 402, etc., can receive the communications, as secured, from the receiving device. For example, in method 600, optionally at Block 616, communications received from the receiving device can be decoded, based on a secret key generated from at least a portion of the path information for at least a portion of the multiple reference signals. In an aspect, securing component 454, e.g., in conjunction with processor(s) 412, memory 416, transceiver 402, BS communicating component 442, etc., can decode, based on the secret key generated from at least the portion of the path information for at least the portion of the multiple reference signals, communications received from the receiving device.

Figure 8:
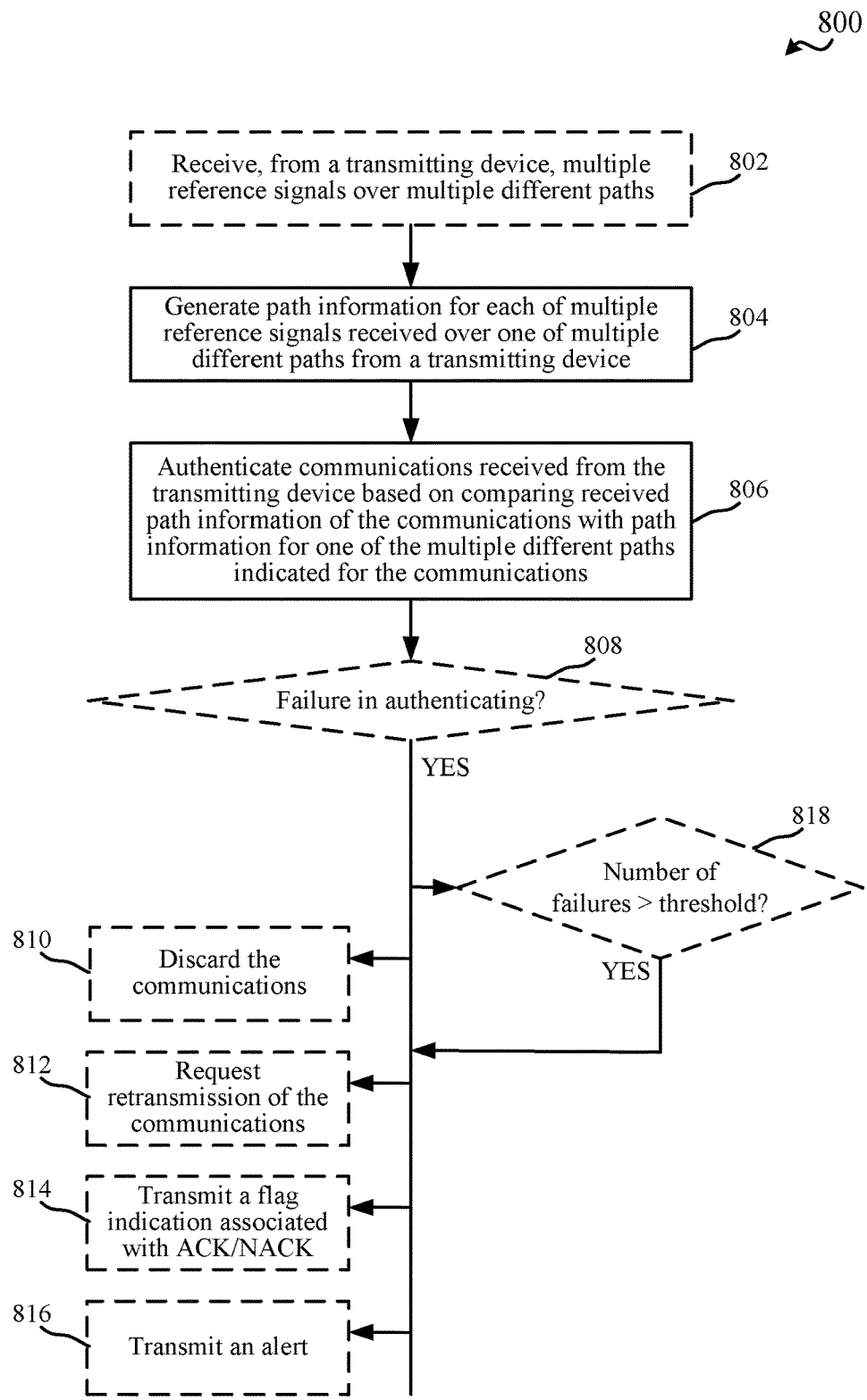
FIG. 8 illustrates a flow chart of an example of a method for authenticating physical layer communications based on estimated path information, in accordance with aspects described herein.
Figure 9:
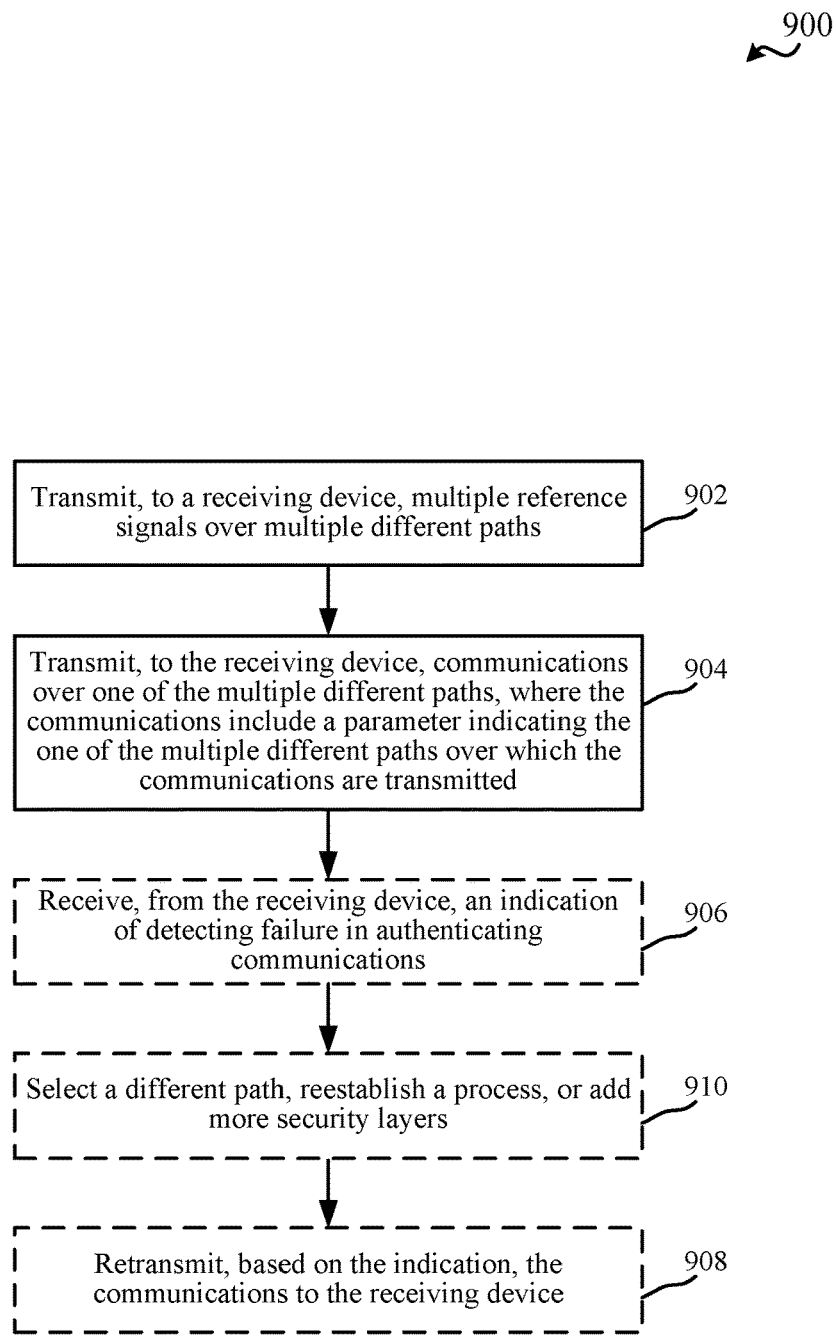
FIG. 9 illustrates a flow chart of an example of a method for including information for authenticating physical layer communications based on received path information, in accordance with aspects described herein.

FIG. 8 illustrates a flow chart of an example of a method 800 for authenticating physical layer communications based on estimated path information, in accordance with aspects described herein. FIG. 9 illustrates a flow chart of an example of a method 900 for including information for authenticating physical layer communications based on received path information, in accordance with aspects described herein. In an example, a UE 104 can perform the functions described in method 800 using one or more of the components described in FIGS. 1 and 3, and a base station 102 or another UE (e.g., in sidelink communications with UE 104) can perform the functions described in method 900 using one or more of the components described in FIGS. 1 and 4. Methods 800 and 900 are described in conjunction with one another for ease of explanation. These methods, however, are not required to be performed in conjunction with one another, and different devices can be configured to perform the methods without requiring the other device.

In method 900, at Block 902, multiple reference signals can be transmitted, to a receiving device, over multiple different paths. In an aspect, BS communicating component 442, e.g., in conjunction with processor(s) 412, memory 416, transceiver 402, etc., can transmit, to the receiving device, multiple reference signals over multiple different paths, as described above in reference to Block 602 in method 600 of FIG. 6.

In method 800, optionally at Block 802, multiple reference signals can be received, from a transmitting device, over multiple different paths. In an aspect, UE communicating component 342, e.g., in conjunction with processor(s) 312, memory 316, transceiver 302, etc., can receive, from the transmitting device (e.g., a base station 102 or another UE), the multiple reference signals over the multiple different paths, as described above in reference to Block 502 in method 500 of FIG. 5.

In method 800, at Block 804, path information for each of multiple reference signals received over one of multiple different paths from a transmitting device can be generated. In an aspect, path information component 352, e.g., in conjunction with processor(s) 312, memory 316, transceiver 302, UE communicating component 342, etc., can generate the path information for each of multiple reference signals received over one of multiple different paths from the transmitting device, as described above in reference to Block 504 in method 500 of FIG. 5.

In method 900, at Block 904, communications can be transmitted, to the receiving device, over one of the multiple different paths, where the communications include a parameter indicating one of the multiple different paths over which the communications are transmitted. In an aspect, BS communicating component 442, e.g., in conjunction with processor(s) 412, memory 416, transceiver 402, etc., can transmit, to the receiving device, communications over one of the multiple different paths, where the communications can include the parameter indicating the one of the multiple different paths over which the communications are transmitted. For example, authentication information component 456 can insert the parameter in the communications, which indicates the path over which the communications are transmitted. For example, referring to FIG. 7, authentication information component 456 can include the parameter in the communications indicating whether the communications are transmitted over Path 1 or Path 2 (or using an associated beam 704 or 706).

In this example, path information can be used to authenticate the received message, as described further herein. For example, with each downlink control information (DCI), sidelink control information (SCI), physical sidelink shared channel (PSSCH), physical downlink shared channel (PDSCH), physical uplink shared channel (PUSCH), etc., the transmitting device can send the route/path information to final destination. For example, the transmitting device can use the beam that direct the signal to the forwarding signal, which can forward the signal to the receiving device's direction and results in a certain overall distance/pathloss of X and certain AoA Y at the receiving device. This information can be used to verify that the signal came from the path indicated in the signal.

In method 800, at Block 806, communications received from the transmitting device can be authenticated based on comparing received path information of the communications with path information for one of the multiple different paths indicated for the communications. In an aspect, authenticating component 356, e.g., in conjunction with processor(s) 312, memory 316, transceiver 302, UE communicating component 342, etc., can authenticate the communications received from the transmitted device based on comparing received path information of the communications (e.g., path information observed of the communications) with path information for one of the multiple different paths indicated for the communications (e.g., path information as generated at Block 804 for the path indicated for the communications. For example, authenticating component 356 can generate path information for the received communications, such as distance, ToA, pathloss, AoA, etc., and can determine whether this path information matches, or is at least within a threshold difference of, the path information generated, at Block 804, for the path indicated in the communications.

In method 800, optionally at Block 808, it can be determined whether there is a failure in authenticating the communications. In an aspect, authenticating component 356, e.g., in conjunction with processor(s) 312, memory 316, transceiver 302, UE communicating component 342, etc., can determine whether there is a failure in authenticating the communications. For example, authenticating component 356 can determine failure where there is a discrepancy (or at least a threshold difference) between the path information previously generated for the path indicated in the communications and the path information observed for the communications.

In an example, if a failure in authenticating is detected at Block 808, optionally at Block 810, the communications can be discarded. In an aspect, authenticating component 356, e.g., in conjunction with processor(s) 312, memory 316, transceiver 302, UE communicating component 342, etc., can discard the communications, as received, based on the authentication failure. In another example, if a failure in authenticating is detected at Block 808, optionally at Block 812, retransmission of the communications can be requested. In an aspect, authenticating component 356, e.g., in conjunction with processor(s) 312, memory 316, transceiver 302, UE communicating component 342, etc., can request retransmission of the communications from the transmitting device based on the authentication failure. In another example, if a failure in authenticating is detected at Block 808, optionally at Block 814, a flag indication associated with acknowledgement (ACK)/negative-ACK (NACK), can be transmitted. In an aspect, authenticating component 356, e.g., in conjunction with processor(s) 312, memory 316, transceiver 302, UE communicating component 342, etc., can transmit a flag indication associated with ACK/NACK of the communications based on the authentication failure (if the communications are data communications) or in separate feedback resources. In these examples, the UE 104 can discard the communications.

In this example, in method 900, optionally at Block 906, an indication of detecting failure in authenticating communications can be received from the receiving device. In an aspect, BS communicating component 442, e.g., in conjunction with processor(s) 412, memory 416, transceiver 402, etc., can receive, from the receiving device, the indication of detecting failure in authenticating communications. For example, the indication can include a request for retransmission, the flag indication associated with ACK/NACK for the communications, etc. In any case, for example, optionally at Block 908, the communications can be retransmitted to the receiving device based on the indication. In an aspect, BS communicating component 442, e.g., in conjunction with processor(s) 412, memory 416, transceiver 402, etc., can retransmit, based on the indication, the communications to the receiving device.

In one example in method 900, optionally at Block 910, a different path can be selected, a process can be reestablished, or more security layers can be added before transmitting the communications. In an aspect, BS communicating component 442, e.g., in conjunction with processor(s) 412, memory 416, transceiver 402, etc., can select a different path for communications (e.g., Path 1 where the communications where previously transmitted over Path 2), or can reestablish a process for transmitting communications, or can add more security layers for transmitting the communications before retransmitting the communications. This can be in response to the indication of authentication failure.

In an example, selecting a different path or reestablishing the process can improve hearability of the retransmission, where the initial transmission at Block 904 is not properly received. In another example, adding more security layers can further protect from malicious communications, where the receiving device receives a communication from a different transmitting device (based on a discrepancy in observed path information).

In another example, referring to FIG. 8, the UE 104, as the receiving device, can process the communications and can send an alert. In method 800, optionally at Block 816, an alert can be transmitted. In an aspect, authenticating component 356, e.g., in conjunction with processor(s) 312, memory 316, transceiver 302, UE communicating component 342, etc., can transmit an alert to the transmitting device to indicate the failure in authenticating.

In one example, one or more of the actions in Blocks 810, 812, 814, 816 can be performed when there are a certain number of failures in authenticating a given communication (e.g., based on additional subsequent failures in authenticating retransmissions of the communication). In method 800, optionally at Block 818, it can be determined whether the number of failures achieves a threshold. If so, one or more of Blocks 810, 812, 814, 816 can be performed. For example, where an alert is transmitted at Block 816, this alert can be sent after each transmission associated with ACK/NACK of the message (if the message is a data message) or in a separate feedback resources. In another example, this alert can be sent after authentication fails the threshold number of times, where the transmitting device can configure the threshold for the receiving device to use. For example, the transmitting device can configure the threshold as a parameter in a layer 1 (e.g., PHY layer, such as in downlink control information (DCI)), layer 2 (e.g., MAC layer, such as in MAC-control element (CE)), layer 3 (e.g., RRC layer, such as in a RRC signal), etc. configuration. In another example, the alert can be sent where authentication fails a threshold number of times within a configured time window (e.g., where the number of failure achieve the threshold at Block 818 within the configured time window). For example, the configured time window can include a number of slots, a number of milliseconds, etc. In an example, the transmitting device can configure the threshold and/or the time window as a parameter in a layer 1, 2, or 3 configuration.

Figure 10:
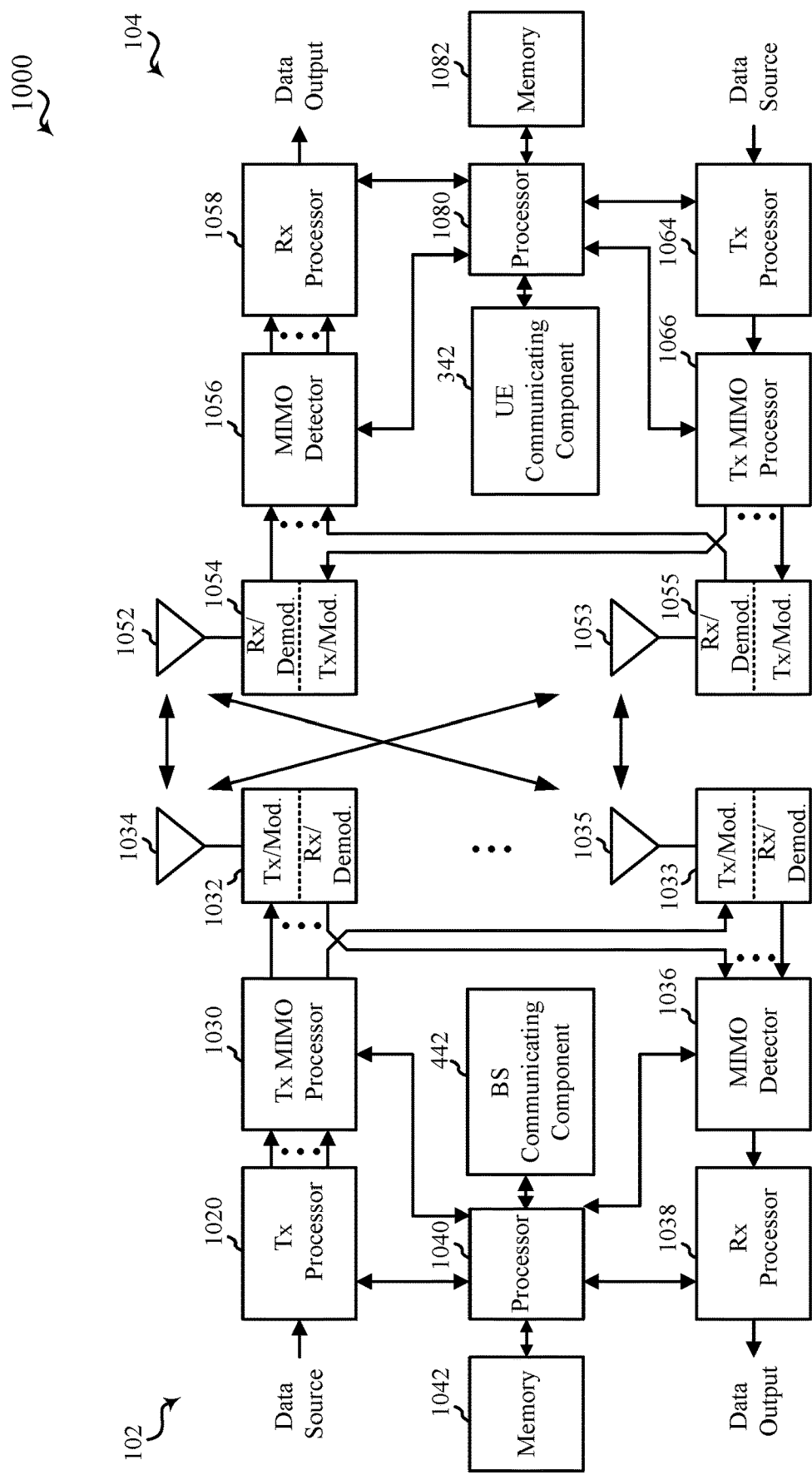
FIG. 10 is a block diagram illustrating an example of a multiple-input multiple-output (MIMO) communication system including a base station and a UE, in accordance with various aspects of the present disclosure.

FIG. 10 is a block diagram of a MIMO communication system 1000 including a base station 102 and a UE 104. The MIMO communication system 1000 may illustrate aspects of the wireless communication access network 100 described with reference to FIG. 1. The base station 102 may be an example of aspects of the base station 102 described with reference to FIG. 1. The base station 102 may be equipped with antennas 1034 and 1035, and the UE 104 may be equipped with antennas 1052 and 1053. In the MIMO communication system 1000, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 1020 may receive data from a data source. The transmit processor 1020 may process the data. The transmit processor 1020 may also generate control symbols or reference symbols. A transmit MIMO processor 1030 may perform spatial processing (e.g., precoding) on data symbols, control symbols, or reference symbols, if applicable, and may provide output symbol streams to the transmit modulator/demodulators 1032 and 1033. Each modulator/demodulator 1032 through 1033 may process a respective output symbol stream (e.g., for OFDM, etc.) to obtain an output sample stream. Each modulator/demodulator 1032 through 1033 may further process (e.g., convert to analog, amplify, filter, and upconvert) the output sample stream to obtain a DL signal. In one example, DL signals from modulator/demodulators 1032 and 1033 may be transmitted via the antennas 1034 and 1035, respectively.

The UE 104 may be an example of aspects of the UEs 104 described with reference to FIGS. 1-2. At the UE 104, the UE antennas 1052 and 1053 may receive the DL signals from the base station 102 and may provide the received signals to the modulator/demodulators 1054 and 1055, respectively. Each modulator/demodulator 1054 through 1055 may condition (e.g., filter, amplify, downconvert, and digitize) a respective received signal to obtain input samples. Each modulator/demodulator 1054 through 1055 may further process the input samples (e.g., for OFDM, etc.) to obtain received symbols. A MIMO detector 1056 may obtain received symbols from the modulator/demodulators 1054 and 1055, perform MIMO detection on the received symbols, if applicable, and provide detected symbols. A receive (Rx) processor 1058 may process (e.g., demodulate, deinterleave, and decode) the detected symbols, providing decoded data for the UE 104 to a data output, and provide decoded control information to a processor 1080, or memory 1082.

The processor 1080 may in some cases execute stored instructions to instantiate a UE communicating component 342 (see e.g., FIGS. 1 and 2).

On the uplink (UL), at the UE 104, a transmit processor 1064 may receive and process data from a data source. The transmit processor 1064 may also generate reference symbols for a reference signal. The symbols from the transmit processor 1064 may be precoded by a transmit MIMO processor 1066 if applicable, further processed by the modulator/demodulators 1054 and 1055 (e.g., for SC-FDMA, etc.), and be transmitted to the base station 102 in accordance with the communication parameters received from the base station 102. At the base station 102, the UL signals from the UE 104 may be received by the antennas 1034 and 1035, processed by the modulator/demodulators 1032 and 1033, detected by a MIMO detector 1036 if applicable, and further processed by a receive processor 1038. The receive processor 1038 may provide decoded data to a data output and to the processor 1040 or memory 1042.

The processor 1040 may in some cases execute stored instructions to instantiate a BS communicating component 442 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 1000. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 1000.

The following aspects are illustrative only and aspects thereof may be combined with aspects of other embodiments or teaching described herein, without limitation.

Aspect 1 is a method for wireless communication including generating, by a receiving device, path information for each of multiple reference signals received over one of multiple different paths from a transmitting device, and at least one of: decoding communications received from the transmitting device based on a secret key generated from at least a portion of the path information for at least a portion of the multiple reference signals; encoding communications for transmitting to the transmitting device based on the secret key generated from at least the portion of the path information for at least the portion of the multiple reference signals; or authenticating communications received from the transmitting device based on comparing received path information of the communications with the path information for one of the multiple different paths indicated for the communications.

In Aspect 2, the method of Aspect 1 includes where the path information for a given reference signal of the multiple reference signals includes at least one of a pathloss computed for the given reference signal, a time-of-arrival of the given reference signal, or an angle-of-arrival for the given reference signal.

In Aspect 3, the method of any of Aspects 1 or 2 includes transmitting, to the transmitting device, the path information generated for each of the multiple reference signals.

In Aspect 4, the method of Aspect 3 includes generating the secret key based at least in part on applying a function of the path information for two or more of the multiple reference signals in an order.

In Aspect 5, the method of Aspect 4 includes where the order is based on receiving each of the multiple reference signals from the transmitting device.

In Aspect 6, the method of any of Aspects 4 or 5 includes receiving, from the transmitting device, an indication of the order.

In Aspect 7, the method of any of Aspects 1 to 6 includes where the communications include a parameter indicating the one of the multiple different paths used to transmit the communications.

In Aspect 8, the method of any of Aspects 1 to 7 includes where authenticating the communications includes detecting failure in authenticating where the received path information of the communications does not match the path information generated for the one of the multiple different paths indicated for the communications.

In Aspect 9, the method of Aspect 8 includes discarding the communications based on detecting the failure in authenticating.

In Aspect 10, the method of any of Aspects 8 or 9 includes requesting, from the transmitting device, retransmission of the communications based on detecting the failure in authenticating.

In Aspect 11, the method of any of Aspects 8 to 10 includes transmitting, to the transmitting device, a flag indication associated with ACK/NACK based on detecting the failure in authenticating.

In Aspect 12, the method of any of Aspects 8 to 11 includes transmitting, to the transmitting device, an alert after each transmission of the communications received based on transmitting feedback, based on detecting the failure in authenticating each transmission.

In Aspect 13, the method of any of Aspects 8 to 12 includes transmitting, to the transmitting device, an alert after detecting failure in authenticating a number of transmissions of the communications, where the number is configured via downlink control information, MAC-CE, or RRC.

In Aspect 14, the method of any of Aspects 8 to 13 includes transmitting, to the transmitting device, an alert after detecting failure in authenticating a number of transmissions of the communications within a time window, where at least one of the number or the time window is configured via downlink control information, MAC-CE, or RRC.

Aspect 15 is a method for wireless communication including transmitting, to a receiving device, multiple reference signals over multiple different paths, receiving, from the receiving device, path information for each of the multiple reference signals, and at least one of: encoding, based on a secret key generated from at least a portion of the path information for at least a portion of the multiple reference signals, communications for transmitting to the receiving device; decoding, based on the secret key generated from at least the portion of the path information for at least the portion of the multiple reference signals, communications received from the receiving device; or transmitting, to the receiving device, communications over one of the multiple different paths, where the communications include a parameter indicating the one of the multiple different paths over which the communications are transmitted.

In Aspect 16, the method of Aspect 15 includes where the path information for a given reference signal of the multiple reference signals includes at least one of a pathloss computed for the given reference signal, a time-of-arrival of the given reference signal, or an angle-of-arrival for the given reference signal.

In Aspect 17, the method of any of Aspects 15 or 16 includes generating the secret key based at least in part on applying, via a function, the path information for two or more of the multiple reference signals in an order.

In Aspect 18, the method of Aspect 17 includes where the order is based on transmitting each of the multiple reference signals to the receiving device.

In Aspect 19, the method of any of Aspects 17 or 18 includes transmitting, to the receiving device, an indication of the order.

In Aspect 20, the method of any of Aspects 15 to 19 includes receiving, from the receiving device, an indication of detecting failure in authenticating the communications, and retransmitting, based on the indication, the communications to the receiving device.

In Aspect 21, the method of Aspect 20 includes transmitting, to the receiving device, a configuration indicating one or more parameters for triggering reporting of detecting of the failure in authenticating.

In Aspect 22, the method of Aspect 21 includes where the one or more parameters include one or more of a number of transmissions for which the failure in authenticating is detected to trigger the reporting, or a time window within which failure in authenticating is detected for the number of transmissions to trigger the reporting.

Aspect 23 is an apparatus for wireless communication including a transceiver, a memory configured to store instructions, and one or more processors communicatively coupled with the memory and the transceiver, where the one or more processors are configured to execute the instructions to cause the apparatus to perform any of the methods of Aspects 1 to 22.

Aspect 24 is an apparatus for wireless communication including means for performing any of the methods of Aspects 1 to 22.

Aspect 25 is a computer-readable medium including code executable by one or more processors for wireless communications, the code including code for performing any of the methods of Aspects 1 to 22.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
    a transceiver;
    a memory configured to store instructions; and
    one or more processors communicatively coupled with the memory and the transceiver, wherein the one or more processors are configured to:
        generate path information for each of multiple reference signals received over a different one of multiple different paths from a transmitting device, wherein each of the multiple different paths is based on a different transmit beam used by the transmitting device and is associated with a different angle-of-arrival at the apparatus, and wherein the path information for a given reference signal of the multiple reference signals includes at least one of a pathloss computed for the given reference signal, a time-of-arrival of the given reference signal, or an angle-of-arrival for the given reference signal;
        transmit, to the transmitting device, the path information generated for each of the multiple reference signals;
        receive, from the transmitting device, an indication of an ordering for applying the path information for two or more of the multiple reference signals to generate a secret key; and
        at least one of:
            decode communications received in a signal from the transmitting device based on the secret key; or
            encode communications for transmitting in a signal to the transmitting device based on the secret key.

2. The apparatus of claim 1, wherein the one or more processors are further configured to generate the secret key based at least in part on applying a function of the path information for the two or more of the multiple reference signals based on the ordering.

3. The apparatus of claim 2, wherein the ordering is based on a receiving order of receiving each of the two or more of the multiple reference signals from the transmitting device.

4. The apparatus of claim 1, wherein the communications include a parameter indicating one of the multiple different paths used to transmit the communications.

5. The apparatus of claim 1, wherein the one or more processors are configured further to authenticate the communications received in a signal from the transmitting device based on comparing received path information observed for the communications with the path information for one of the multiple different paths indicated in the communications.

6. The apparatus of claim 5, wherein the one or more processors are configured to authenticate the communications including detecting failure in authenticating where the received path information of the communications does not match the path information.

7. The apparatus of claim 6, wherein the one or more processors are configured further to discard the communications based on detecting the failure in authenticating.

8. The apparatus of claim 6, wherein the one or more processors are configured to request, from the transmitting device, retransmission of the communications based on detecting the failure in authenticating.

9. The apparatus of claim 6, wherein the one or more processors are further configured to transmit, to the transmitting device, a flag indication associated with acknowledgement (ACK)/negative-ACK (NACK) based on detecting the failure in authenticating.

10. The apparatus of claim 6, wherein the one or more processors are further configured to transmit, to the transmitting device, an alert after each transmission of the communications received based on transmitting feedback, based on detecting the failure in authenticating each transmission.

11. The apparatus of claim 6, wherein the one or more processors are further configured to transmit, to the transmitting device, an alert after detecting failure in authenticating a number of transmissions of the communications, wherein the number is configured via downlink control information, media access control (MAC)-control element (CE), or radio resource control (RRC) signaling.

12. The apparatus of claim 6, wherein the one or more processors are further configured to transmit, to the transmitting device, an alert after detecting failure in authenticating a number of transmissions of the communications within a time window, wherein at least one of the number or the time window is configured via downlink control information, media access control (MAC)-control element (CE), or radio resource control (RRC) signaling.

13. A method for wireless communication, comprising:
    generating, by a receiving device, path information for each of multiple reference signals received over a different one of multiple different paths from a transmitting device, wherein each of the multiple different paths is based on a different transmit beam used by the transmitting device and is associated with a different angle-of-arrival at the receiving device, and wherein the path information for a given reference signal of the multiple reference signals includes at least one of a pathloss computed for the given reference signal, a time-of-arrival of the given reference signal, or an angle-of-arrival for the given reference signal;

transmitting, to the transmitting device, the path information generated for each of the multiple reference signals;

receiving, from the transmitting device, an indication of an ordering for applying the path information for two or more of the multiple reference signals to generate a secret key; and at least one of:
- decoding communications received in a signal from the transmitting device based on the secret key; or
- encoding communications for transmitting in a signal to the transmitting device based on the secret key.

14. The method of claim 13, further comprising generating the secret key based at least in part on applying a function of the path information for the two or more of the multiple reference signals based on the ordering.

15. The method of claim 13, wherein the communications include a parameter indicating one of the multiple different paths used to transmit the communications.

16. The method of claim 13, further comprising authenticating the communications received in a signal from the transmitting device based on comparing received path information observed for the communications with the path information for one of the multiple different paths indicated in the communications.

17. The method of claim 16, wherein authenticating the communications includes detecting failure in authenticating where the received path information of the communications does not match the path information generated for one of the multiple different paths indicated for the communications.

* * * * *